(12) United States Patent
Nimmagadda

(10) Patent No.: US 10,102,159 B2
(45) Date of Patent: Oct. 16, 2018

(54) METHOD OF ACHIEVING LOW WRITE LATENCY IN A DATA STORAGE SYSTEM

(71) Applicant: SAMSUNG ELECTRONICS CO., LTD., Suwon-si, Gyeonggi-do (KR)

(72) Inventor: Venkataratnam Nimmagadda, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/644,325

(22) Filed: Jul. 7, 2017

(65) Prior Publication Data

US 2018/0024949 A1    Jan. 25, 2018

(30) Foreign Application Priority Data

Jul. 22, 2016  (IN) .............................. 201641025124

(51) Int. Cl.
| | |
|---|---|
| *G06F 3/06* | (2006.01) |
| *G06F 13/16* | (2006.01) |
| *G06F 13/42* | (2006.01) |
| *G06F 13/40* | (2006.01) |

(52) U.S. Cl.
CPC ........ *G06F 13/1673* (2013.01); *G06F 3/0611* (2013.01); *G06F 3/0653* (2013.01); *G06F 3/0656* (2013.01); *G06F 3/0659* (2013.01); *G06F 3/0679* (2013.01); *G06F 13/4068* (2013.01); *G06F 13/4282* (2013.01); *G06F 2213/0026* (2013.01)

(58) Field of Classification Search
CPC .. G06F 13/1673; G06F 3/0653; G06F 3/0656; G06F 3/0659; G06F 2213/0026
See application file for complete search history.

(56) References Cited

U.S. PATENT DOCUMENTS

| | | | |
|---|---|---|---|
| 2012/0089854 A1* | 4/2012 | Breakstone | G06F 1/30 713/323 |
| 2014/0223071 A1* | 8/2014 | Bert | G06F 13/28 711/103 |
| 2015/0019798 A1* | 1/2015 | Huang | G06F 12/0246 711/103 |
| 2017/0090753 A1* | 3/2017 | Benisty | G06F 3/061 |
| 2017/0123722 A1* | 5/2017 | Sela | G06F 3/0656 |
| 2017/0262191 A1* | 9/2017 | Dewakar | G06F 3/0611 |
| 2017/0315741 A1* | 11/2017 | Hashimoto | G06F 3/0619 |
| 2017/0322897 A1* | 11/2017 | Benisty | G06F 13/37 |

* cited by examiner

*Primary Examiner* — Glenn A. Auve
(74) *Attorney, Agent, or Firm* — Myers Bigel, P.A.

(57) ABSTRACT

A data storage system includes a host having a write buffer, a memory region, a submission queue and a driver therein. The driver is configured to: (i) transfer data from the write buffer to the memory region in response to a write command, (ii) generate a write command completion notice; and (iii) send at least an address of the data in the memory region to the submission queue. The host may also be configured to transfer the address to a storage device external to the host, and the storage device may use the address during an operation to transfer the data in the memory region to the storage device.

13 Claims, 4 Drawing Sheets

METHOD OF ACHIEVING LOW WRITE LATENCY IN A DATA STORAGE SYSTEM

REFERENCE TO PRIORITY APPLICATION

This application claims priority from Indian Patent Application No. 201641025124, filed Jul. 22, 2016 in the Intellectual Property India, and all the benefits accruing therefrom under 35 U.S.C. 119, the contents of which are hereby incorporated herein by reference.

BACKGROUND

1. Technical Field

The embodiments herein relate to data storage systems and, more particularly, to methods of achieving low write latency in data storage systems.

2. Description of the Related Art

Peripheral component interconnect express (PCIe) based solid-state drives (SSDs) technology is the latest incarnation of the solid-state drive revolution. For the most part, SSDs have used conventional storage interfaces designed to support mechanical drives, but recently drives have been developed for the high-speed PCIe bus interface. The advantage of PCIe based SSD drives is increased performance.

In the conventional PCIe non-volatile memory express (NVMe) based SSDs, there is a latency involved in processing a write command. Initially, data associated with a write (WR) command is prepared by an application (running in a host) and sends the data to a write buffer within the host. The application informs a driver in the host about the WR command. The driver submits the WR command to a submission queue. The driver then rings a doorbell to indicate the SSD about the WR command in the submission queue. The SSD fetches the WR command from the submission queue and then fetches the WR command data from the write buffer to an internal buffer in the SSD. Further, the driver posts the completion of the write command WR to the application after the driver receives the WR command completion indication from the SSD.

In the above mentioned steps, the difference in a time interval in which the application prepares the WR command and receiving the WR command's completion indication from the driver indicates the WR command latency. In the conventional PCIe NVMe based SSDs, the WR command's completion is indicated by the driver to the application, only when the data of the WR command is fetched by device, and the WR command completion indication is received from the SSD.

The WR command management in the conventional PCIe NVMe based SSDs cannot guarantee a deterministic latency to the application, since the PCIe is shared among different components.

The above information is presented as background information only to help the reader understand the present invention. Applicants have made no determination and make no assertion as to whether any of the above might be applicable as Prior Art with regard to the present application.

SUMMARY

The principal object of the embodiments described herein is to provide a method of achieving low write latency in a data storage system.

Another object of the embodiments described herein is to provide a method and system to achieve deterministic write latency in peripheral component interconnect express (PCIe) based non-volatile memory (NVMe) solid state drive (SSD)

Another object of the embodiments described herein is to provide a method and system to achieve low write latency in the PCIe based NVMe SSD.

Aspects of the present disclosure are not limited to the above-mentioned objects, and other objects that have not been mentioned will be clearly understood by those skilled in the art from the following description.

According to some embodiments of the invention, a data storage system is provided, which includes a host having a write buffer, a memory region, a submission queue and a driver therein. The driver is configured to: (i) transfer data from the write buffer to the memory region in response to a write command, (ii) generate a write command completion notice; and (iii) send at least an address of the data in the memory region to the submission queue. According to some of these embodiments of the invention, the write command completion notice can be generated in response to completion of the data transfer. The host may also be configured to transfer the address to a storage device external to the host. In addition, the storage device may use the address during an operation to transfer the data in the memory region to the storage device. This operation to transfer the data in the memory region to the storage device may occur in response to a read command issued by the storage device to the memory region in the host. The storage device may also notify the driver of the transfer of the data in the memory region to the storage device.

Additional embodiments described herein provide a data storage system. The data storage system includes a storage device and a host. The host includes a driver. The driver is configured to read data from a write buffer in the host, in response to a write command received from an application in the host. The driver is configured to send the data to a memory region in the host. The driver is configured to send completion of the write command to the application. Further the driver is configured to send the write command to a submission queue in the host, wherein the write command includes address of the data in the memory region. Furthermore, the driver is configured to release the memory region in response to determining that data is obtained by the storage device.

Accordingly, the embodiments described herein provide a method of achieving low write latency in a data storage system. The method includes reading data from a write buffer in a host in response to a write command received from an application in the host. The method includes sending the data to a memory region in the host. The method includes sending completion of the write command to the application. Further the method includes sending the write command to a submission queue in the host. The write command includes address of the data in the memory region. Furthermore, the method includes releasing the memory region in response to determining that the data is obtained by the storage device.

Accordingly, the embodiments described herein provide a computer program product comprising computer executable program code recorded on a computer readable non-transitory storage medium, the computer executable program code when executed causing the actions including reading data from a write buffer in a host, in response to a write command received from an application in the host. The computer executable program code when executed causing the further actions including sending the data to a memory region in the host. The computer executable program code when executed causing the further actions including sending completion of the write command to the application. The computer executable program code when executed causing the further actions including sending a write command to a submission queue in the host, wherein the write command includes address of the data in the memory region. The computer executable program code when executed causing the further actions including releasing the memory region in the host, in response to determining that the storage device obtained the data from the memory region.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Figure 1:
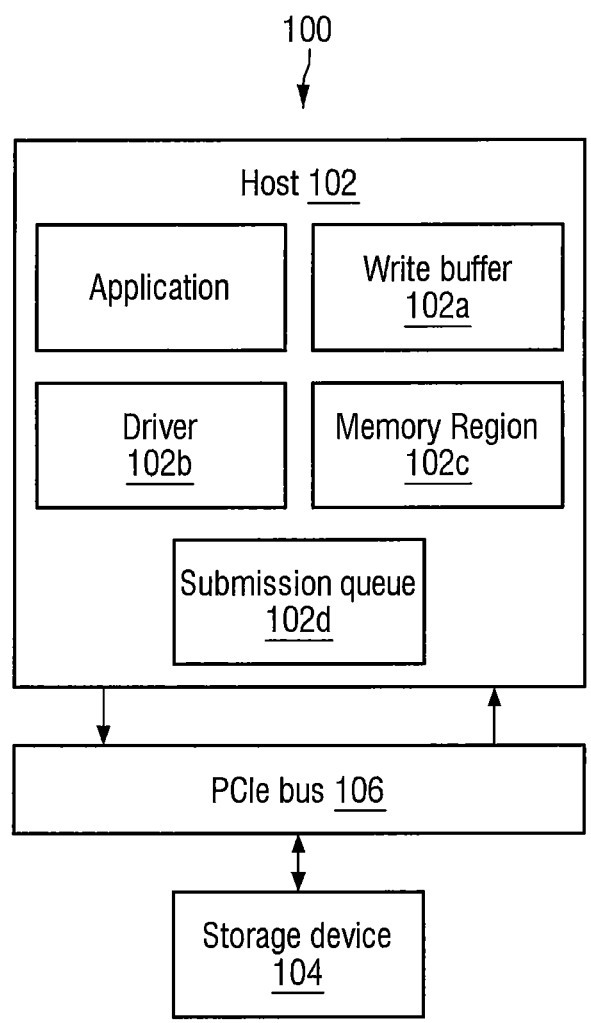
FIG. 1 illustrates a data storage system for managing a write command, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a method of achieving low write latency in a data storage system. The method includes reading data from a write buffer in a host in response to a write command received from an application in the host. The method includes sending the data to a memory region in the host. The method includes sending completion of the write command to the application. Further the method includes sending the write command to a submission queue in the host. In an embodiment, the write command includes address of the data in the memory region. Furthermore, the method includes releasing the memory region in the host, in response to determining that data is obtained by the storage device.

Unlike the conventional PCIe SSD systems and methods, the proposed method achieves very low write (WR) latency of peripheral component interconnect express (PCIe) non-volatile memory express (NVMe) solid state drive (SSD) in the same order as the that of SSD on Dual In Line Memory Module (DIMM) slot. Further, the proposed method achieves deterministic WR latency irrespective of the shared PCIe traffic.

Referring now to the drawings and more particularly to FIGS. 1 through 4 where similar reference characters denote corresponding features consistently throughout the figures, there are shown preferred embodiments.

FIG. 1 illustrates a data storage system 100, for managing a write command, according to an embodiment as disclosed herein. As depicted in FIG. 1, the data storage system 100 includes a host 102, a storage device 104, and a peripheral component interconnect express (PCIe) bus 106. The host 102 can be any mobile or hand held devices like smart phones, laptop computers, server computers, personal digital assistants (PDAs) or the like. The storage device 104 can be any of a PCIe NVMe SSD or a PCIe based SATAe SSD, a flash storage or the like.

In an embodiment, the host 102 includes an application, a write buffer 102a, a driver 102b, a memory region 102c and a submission queue 102d. The write buffer 102a stores the data to be written to the storage device 104. The driver 102b manages the write (WR) command data transfer to the storage device 104 over the PCIe bus 106. The submission queue 102d contains the commands such as write commands or read commands. The WR commands are sent by the driver 102b into the submission queue 102d.

In an embodiment, the memory region 102c can be within the host 102 memory.

In an embodiment, the storage device 104 obtains data from the memory region by reading the address of the data specified in the WR command (i.e., in a command field) in the submission queue 102d.

Figure 2:
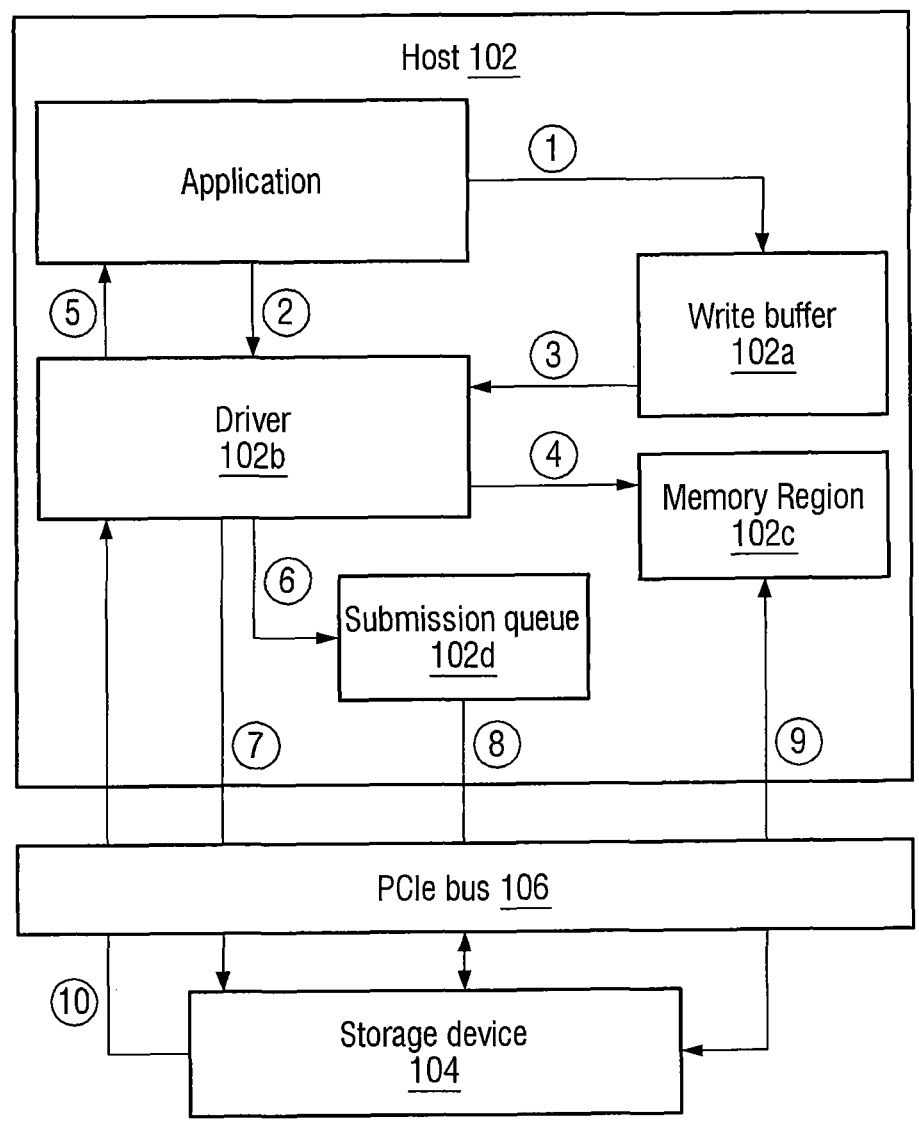
FIG. 2 is a sequential flow diagram illustrating various steps for managing the write command in the data storage system, according to embodiments disclosed herein.

FIG. 2 is a sequential flow illustrating various steps for managing the write command in the data storage system 100, according to an embodiment as disclosed herein. At step 1, an application running in the host 102 prepares a write (WR) command including the data and address of the data in the write buffer 102a, to be written to the storage device 104 and sends the WR command's data to the write buffer 102a. At step 2, the application informs the driver 102b about the WR command with address of the data stored in the write buffer 102a. At step 3, the driver 102b reads the data from the write buffer 102a. At step 4, the driver 102b sends the data to the memory region 102c. At step 5, the driver 102b informs the completion of WR command to the application. At step 6, the driver 102b sends the WR command, which includes the address of the data in the memory region 102c to the submission queue 102d. Unlike to the conventional mechanism, where the WR command completion is sent to the application only after the data is fetched by the storage device 104 and the WR command's completion is posted to the driver 102b by the storage device 104, with the proposed method, the driver 102b informs the completion of WR command to the application, after sending the data to memory region 102c. Hence, with the proposed method, the WR command latency is reduced by sending the completion of WR command to the application by the driver 102b after sending the data to memory region 102c.

At step 7, the driver 102b indicates about WR command to the storage device 104. For example, in NVMe case, driver 102b rings a door bell to indicate the storage device 104 about the WR command to be processed in the submission queue 102d. The door bell ring is a one register write trigger, given by the driver 102b to the storage device 104. At step 8, the storage device 104 obtains the WR command from the submission queue 102d. At step 9, the storage device 104 obtains the WR data from the memory region 102c to an internal buffer of the storage device 104. At step 10, the storage device 104 sends the WR command completion to the driver 102b and in response, the driver 102b releases the memory region 102c such that data pertaining to another WR command can be written in the memory region 102c.

Figure 3:
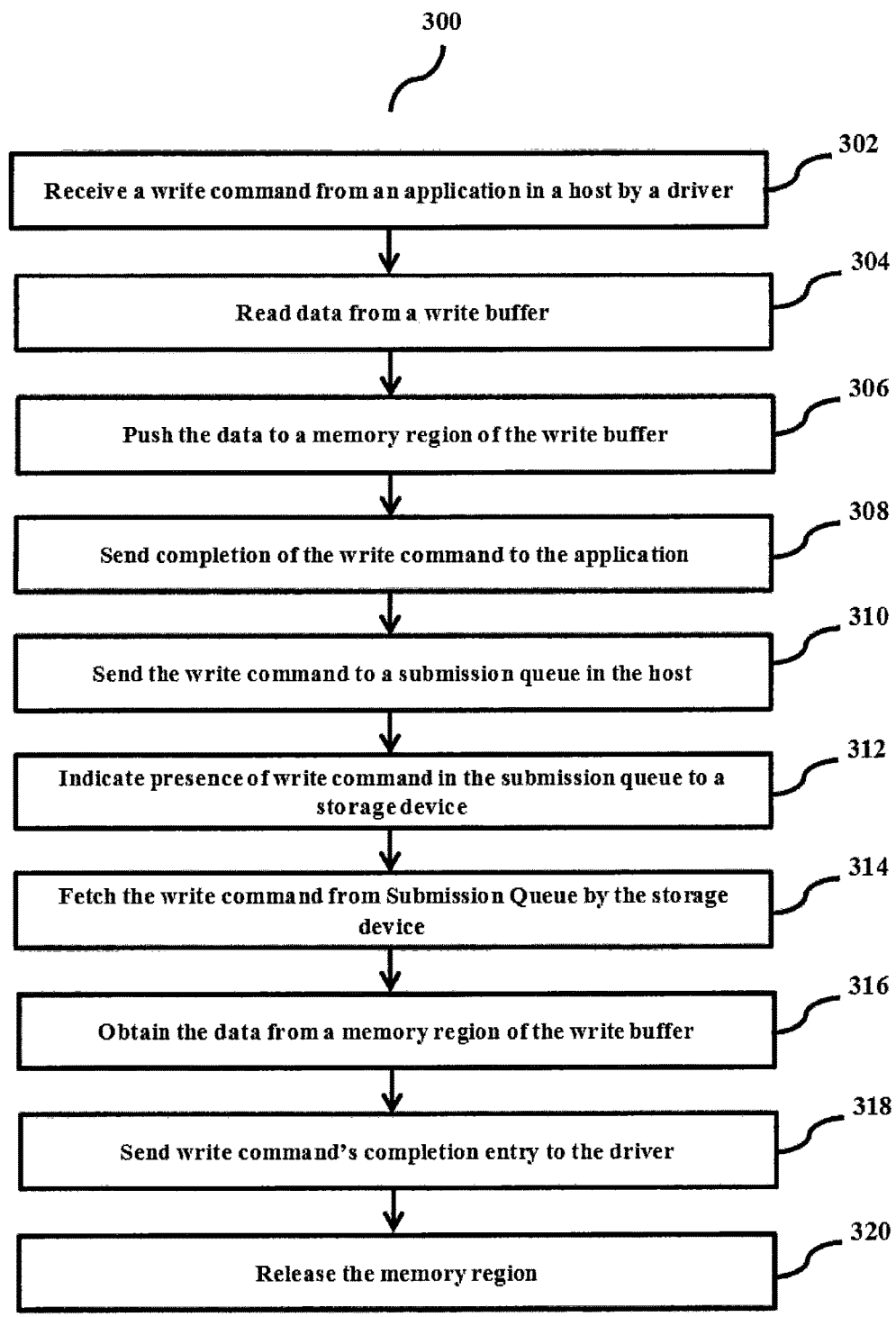
FIG. 3 is a flow chart illustrating methods for managing the write command in the data storage system, according to embodiments disclosed herein.

FIG. 3 is a flow chart illustrating a method 300 for managing the write command in the data storage system 100, according to an embodiment as disclosed herein. In an embodiment, at step 302, the method 300 includes receiving a WR command from an application in a host 102. The method 300 allows the driver 102b to receive a WR command from the application. The WR command includes the address of the data in the write buffer 102a and the data to be written to the storage device 104. At step 304, the method 300 includes reading the WR command's data from the write buffer 102a. The method 300 allows the driver 102b to read the WR command's data from the write buffer 102a. The WR command includes the address of WR data in the write buffer 102a. At step 306, the method 300 includes sending the WR data to a memory region 102c in the host 102. The method 300 allows the driver 102a to send the WR data to the memory region 102c.

In an embodiment, the memory region 102c can be within the host 102 memory. The memory region 102c contains the data corresponding to the WR command in the submission queue 102d. At step 308, the method includes sending completion of the WR command to the application. The method 300 allows the driver 102b to send the completion of the WR command to the application. At step 310, the method 300 includes sending the WR command to a submission queue 102d in the host. The method 300 allows the driver 102b to send the WR command to the submission queue 102d. The WR command in the submission queue 102d contains the address of the WR data in the memory region 102c. At step 312, the method 300 includes indicating the presence of the WR command in the submission queue 102d to the storage device 104. The method 300 allows the driver 102b to ring the door bell to the storage device 104 over a peripheral component interconnect express (PCIe) 106 bus to indicate the presence of the WR command in the submission queue 102d. At step 314, the method 300 includes fetching the WR command from the submission queue 102d. The method 300 allows the storage device 104 to fetch the WR command from the submission queue 102d. At step 316, the method 300 includes obtaining the data from the memory region of the write buffer 102a. The method 300 allows the storage device 104 to obtain the data from the memory region of the write buffer 102a. At step 318, the method 300 includes sending WR command's completion entry to the driver 102b. The method 300 allows the storage device 104 to send the WR command's completion entry to the driver. At step 320, the method 300 includes releasing the data from memory region 102c. The method 300 allows the driver 102b to release the memory region 102c, when the storage device 104 has obtained data from the memory region 102c over the PCIe bus 106 to the internal buffer of the storage device 104 and after the driver 102b has received WR command's completion from the storage device 104, the driver 102b releases the memory region 102c.

The various actions, acts, blocks, steps, or the like in the method 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
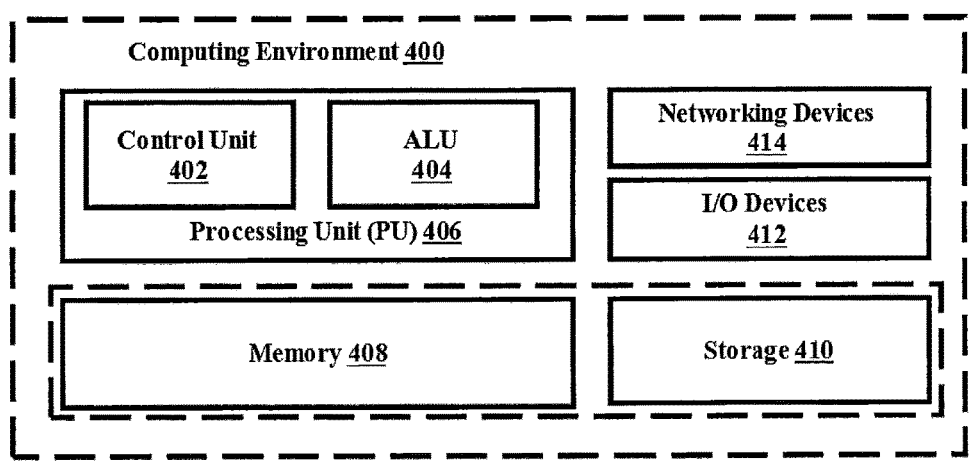
FIG. 4 is a computing environment implementing methods for managing write commands in a data storage system, according to embodiments disclosed herein.

FIG. 4 is a computing environment implementing the method of achieving low write latency in a data storage system, according to an embodiment disclosed herein. As depicted in the FIG. 4, the computing environment 400 comprises at least one processing unit 406 that is equipped with a control unit 402 and an Arithmetic Logic Unit (ALU) 404, a memory 408, a storage unit 410, plurality of networking devices 414 and a plurality of Input output (I/O) devices 412. The processing unit 406 is responsible for processing the instructions of the algorithm. The processing unit 406 receives commands from the control unit 402 in order to perform its processing. Further, any logical and arithmetic operations involved in the execution of the instructions are computed with the help of the ALU 404.

The overall computing environment 400 can be composed of multiple homogeneous and/or heterogeneous cores, multiple CPUs of different kinds, special media and other accelerators. The processing unit 406 is responsible for processing the instructions of the algorithm. Further, the plurality of processing units 406 may be located on a single chip or over multiple chips.

The algorithm comprising of instructions and codes required for the implementation are stored in either the memory unit 408 or the storage 410 or both. At the time of execution, the instructions may be fetched from the corresponding memory 408 or storage 410, and executed by the processing unit 406.

In case of any hardware implementations various networking devices 414 or external I/O devices 412 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 4 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A data storage system, comprising:
   a host having a write buffer, a memory region, a submission queue and a driver therein, said driver configured to transfer data from the write buffer to the memory region in response to a write command, generate a write command completion notice and send at least an address of the data in the memory region to the submission queue.

2. The system of claim 1, wherein the write command completion notice is generated in response to completion of the data transfer.

3. The system of claim 1, wherein said host is configured to transfer the address to a storage device external to said host.

4. The system of claim 3, wherein the storage device uses the address during an operation to transfer the data in the memory region to the storage device.

5. The system of claim 4, wherein the storage device notifies said driver of the transfer of the data in the memory region to the storage device.

6. The system of claim 4, wherein the operation to transfer the data in the memory region to the storage device occurs in response to a read command issued by the storage device to said host.

7. A method of operating a data storage system having a host therein, which comprises a write buffer, a memory region, a submission queue and a driver, said method comprising:
    transferring, by the driver, data from the write buffer to the memory region in response to a write command;
    generating a write command completion notice; and
    sending at least an address of the data in the memory region to the submission queue.

8. The method of claim 7, wherein the write command completion notice is generated in response to completion of the data transfer.

9. The system of claim 7, wherein the data storage system comprises a storage device external to the host; wherein said sending is followed by transferring the address from the submission queue to the storage device; and wherein the storage device uses the address during an operation to transfer the data in the memory region to the storage device.

10. The system of claim 9, wherein the storage device notifies the driver of the transfer of the data in the memory region to the storage device.

11. A data storage system comprising:
    a storage device; and
    a host including:
        a driver configured to:
        read data from a write buffer in the host, in response to a write command received from an application in the host;
        send the data to a memory region in the host;
        send completion of the write command to the application; and
        send the write command to a submission queue in the host, wherein the write command includes address of the data in the memory region.

12. The data storage system of claim 11, wherein the system is configured to:
    indicate, by the driver, presence of the write command in the submission queue to the storage device through a peripheral component interconnect express (PCIe) bus;
    obtain, by the storage device, the data from the memory region; and
    indicate, by the storage device, completion of the write command to the driver.

13. The data storage system of claim 11, wherein the driver is further configured to release memory region in the host, in response to determining that data is obtained by the storage device.

* * * * *